Oct. 8, 1957  G. L. MOSES ET AL  2,809,230
INSULATED COIL
Filed Sept. 27, 1952

INVENTORS
Graham L. Moses &
Marvin M. Fromm
BY
Frederick Shapoe
ATTORNEY

United States Patent Office 2,809,230
Patented Oct. 8, 1957

2,809,230

INSULATED COIL

Graham L. Moses, Pittsburgh, and Marvin M. Fromm, Greensburg, Pa., assignors to Westinghouse Electric Corporation, East Pittsburgh, Pa., a corporation of Pennsylvania Application September 27, 1952, Serial No. 311,926

2 Claims. (Cl. 174—138)

This invention relates to electrical insulation for high-voltage generator half-coils and field coils such as used in high-voltage generators and motors subjected to prolonged periods of operation where it is often necessary that rigid thermal and voltage standards be maintained.

In the past, it has been the practice to provide electrical coils of the above-described type with insulation by meticulously wrapping the coil body with multiple layers of an insulating tape which is generally mica tape bonded with a suitable resin, and then press-curing the taped coil to finished size. This conventional mode of insulation is inherently tedious and requires wrapping by skilled workers, and is a time-consuming and costly operation. Also, any flaw occurring during the wrapping operation may later result in insulation breakdown.

Further, difficulties have been encountered at times with mica tape insulation in large coils used in certain present-day generators and motors. Such difficulties arise due to the forces caused by differential expansion of the copper, iron, and insulation during service. Though the mica itself is not deteriorated by operating conditions, the bonds and impregnating resins in conventional insulations are cracked, thus creating voids that have a marked adverse effect on dielectric strength.

An object of this invention is to provide for use in the insulating of electrical coils, ground-wall insulation comprising pre-formed mating cap members of a silicone elastomer that jointly encase the coil conductors.

Another object of the invention is to provide electrical coils with high-temperature insulation applied thereto, the insulation comprising pre-formed silicone elastomer mating cap members.

A further object of the invention is to provide large electrical coils with flexible ground-wall insulation comprising pre-formed mating cap members of silicone elastomer that will enable the insulation to adjust itself to the dimensional changes brought about by the differences in expansion of the metal parts and the insulation during normal operating temperature cycles.

Other objects of the invention will, in part, be obvious and will, in part, appear hereinafter.

For a fuller understanding of the nature and objects of the invention, reference should be had to the following detailed description taken in connection with the accompanying drawing, in which.

For purposes of illustration, this invention is described as applied, for example, to a high-voltage generator half-coil and to a field coil, flat wound of bare copper strap, the latter being arranged in "pancakes" with some form of flat tape insulation (not shown) disposed between the turns of the copper strap. These "pancakes" can later be connected in groups to form a composite field coil.

In accordance with this invention, electrical ground-wall insulation for such exemplary coils is provided by molding a silicone elastomer to form a pair of partially cured, complementary opposed mating channeled encasing members to fit over and encase the coil body, except for electrical leads thereto (not shown). These encasing or cap members are applied in a partially cured state to the coil to be insulated.

Figure 1:
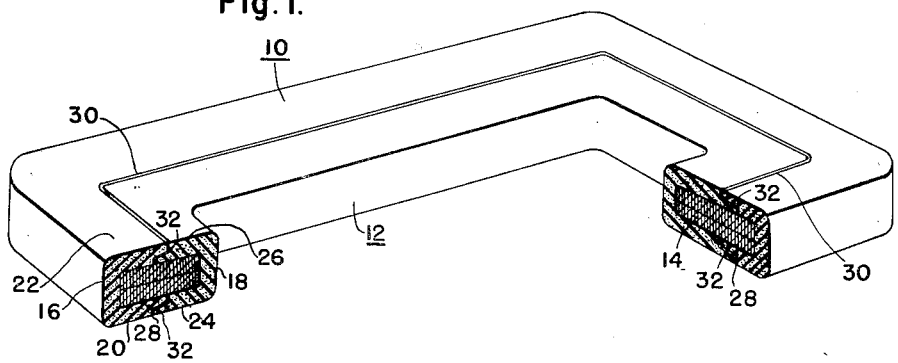
Figure 1 is a perspective view, partly in section, of an insulated coil constructed in accordance with the invention.

Illustrated in Fig. 1 of the drawing is a pair of mating channeled cap members 10 and 12 fitted over a wound coil body 14 of "pancake" form. Coil body 14 is cylindrical in shape with a central opening therethrough for accommodating a magnetic core. As seen in cross section, the channeled cap member 10 comprises a pair of side walls 20 and 22 depending from an end wall 16, and the channeled cap member 12 comprises side walls 24 and 26 depending from an end wall 18. These side walls and end walls form continuous substantially U-shaped channels in the respective caps 10 and 12 as illustrated in Fig. 1 of the drawing.

Cap member 10 is molded to size with dimensions corresponding to those of the coil body 14 and the latter fits into the U-shaped channel formed in the caps; the end portion 16 of the cap member 10 fitting over the outer periphery of the coil body and the side walls 20 and 22 covering substantially one half the area of the flat faces of the coil body. Similarly, cap member 12 is molded so that its end portions 18 fit over the walls of the central opening of the coil body 14, and the side walls 24 and 26 cover the remainder of the uncovered pancake coil. In other words, cap member 10 is disposed diametrically opposite cap member 12 encasing the coil 14.

Side walls 20 and 22 are aligned with and abut side walls 24 and 26, respectively, and their abutting faces form joints 28 and 30, respectively. The joints 28 and 30 are coated with silicone elastomer paste 32 so as to form a sealed joint. The coil body 14 with the applied cap members 10 and 12, together with the applied silicone elastomer paste 32 are then placed in a mold and cured by baking in an oven under pressure. Upon curing, the silicone elastomer paste bonds the corresponding side walls, thereby encasing coil body 14 in a completely sealed insulating covering. The cured silicone elastomer paste at the joints forms a bond that is substantially identical with the cured elastomer composition of the cap members 10 and 12.

In order to avoid air spaces in the insulated coil, the cap members 10 and 12 may be applied to the coil body 14 with a suitable resin or silicone elastomer paste so that the cap members will adhere tightly to the coil body, after curing under pressure, thus filling any spaces that may have existed between the caps and the coil body.

Figure 2:
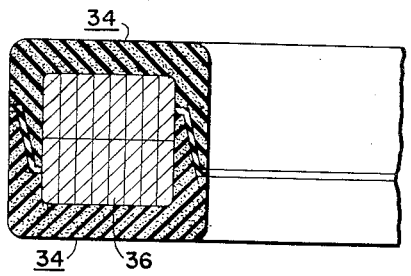
Figure 2 is an enlarged front elevational view partly in section, of an insulated coil, illustrating a modification of the invention.

Illustrated in Fig. 2 of the drawing is a modification showing mating cap members 34. The cap members 34 are applied to a coil conductor 36 of the same general construction as that illustrated in Fig. 1 of the drawing. The cap members 34 are so molded that they encase the wound coil 36 as sohwn. The advantage of this construction is that cap members 34 are identical in shape and size and when fitted together encase the coil body 36. Thus, for preparing caps for use in this modification, only a single mold is required.

Figure 4:
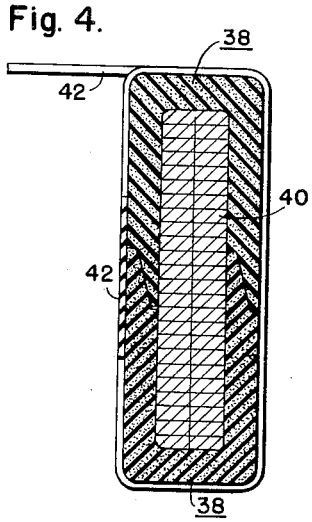
Figure 4 is an enlarged sectional view taken along the line IV—IV of Fig. 3.
Figure 3:
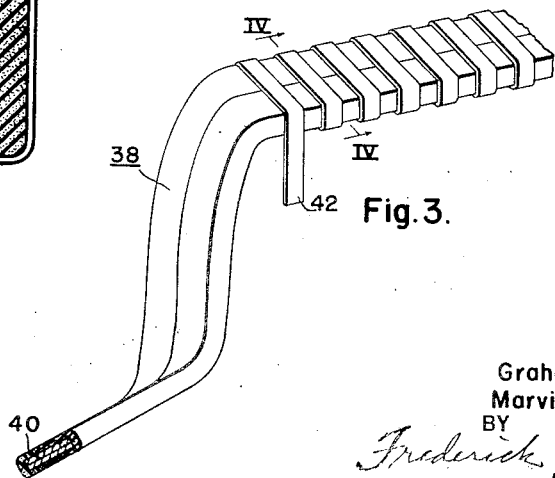
Figure 3 is a perspective view, partly in section, of an insulated high-voltage generator half coil, illustrating a further modification of the invention.

Illustrated in Figs. 3 and 4 of the drawing is a further modification showing mating cap members 38 applied to a high-voltage generator armature half-coil 40. Like the cap members 34, cap members 38 are of identical configuration, but instead of being individually molded as the cap members 34 are, the cap members 38 are preformed by extruding a silicone elastomer through a suitable die to form a continuous straight channel length having the desired cross section. As the partially cured channel is extruded, its length is wound on a drum to await future use.

In applying the extruded silicone rubber channel as insulation for half-coil 40, two lengths of the channel are cut from the drum, each length being long enough to cover the portion of the half-coil 40 to be insulated. The curves at the ends of the body of half-coil 40 are gradual enough that the normally straight cap members 38 can be easily fitted to conform with the configuration of the body of half-coil 40. Since there is no necessity for any preformed curves in the caps 38, they can be prepared by a simple extrusion molding process. The principal requirement as to shape is that the channel portion has a cross section fitting snugly over coil body 40.

It is to be noted in Figures 1 through 4 of the drawing that the mating portions of the side walls of the cap members forming the joint have angled surfaces such as those found in a scarf joint. Therefore, the distance from the coil to the outer surface of the cap members is greater than the perpendicular distance through the cap side wall. This offers greater resistance to the establishment of creepage path through the joint than if a face at a right angle to the cap surface was employed in the joint.

In certain applications, a silicone elastomer paste is not used to seal the joints. In such instances, a glass tape 42 is wrapped around the caps applied to the coil to mechanically bind the caps to the coil as illustrated in Figs. 3 and 4 of the drawing. The coil and bound caps are then baked to finish the curing of the silicone elastomer.

An insulated half-coil of the type illustrated in Figures 3 and 4 of the drawing having a wall thickness of 0.175 inch was assembled as described above, using glass tape overwrap without sealing the joints with paste. The coil was subjected to service in an atmosphere of hydrogen insulating gas at a pressure of 35 p. s. i. g. It was found that coils insulated in this manner would not fail dielectrically below 35 kv. (A.-C.).

By means of the constructions herein described, a coil insulated in such fashion does not require the amount of the hand taping and the multiple layers of insulation which is required in the conventional mode of insulating high-temperature coils. The insulation itself is flexible, thus allowing for the expansion and contraction which occur during high temperature operating service.

An exemplary silicone elastomer for use in preforming the cap members of this invention is prepared from a fluid organo-silicon oxide intermediate polymer having the general formula:

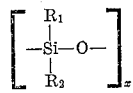

where X may have a numerical value of from 3 to 1000 or more, and $R_1$ and $R_2$ may be the same or different aliphatic radicals. It has been found that excellent results are obtained when $R_1$ and $R_2$ are methyl groups. However, at least a part of $R_1$ and $R_2$ may be ethyl, propyl, butyl, allyl, methallyl, chloroethyl, fluoromethyl, and the like. The unsaturated groups, such as allyl, are preferably a minor proportion of the total R groups. If allyl groups are present, sulfur or sulfur-containing agents may be employed as a vulcanizing agent. The ratio of the aliphatic radicals to silicon may be from 1.9 to 2.2, preferably about 2. The polymer having the general formula

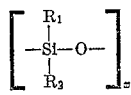

should have a viscosity of from 10 to 5000 centistokes, and preferably in the range of from 100 to 1000 centistokes for convenience in handling. The polymeric molecules may have terminal groups with either three radicals attached to silicon, such as

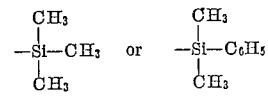

or with a hydroxyl radical and two aliphatic radicals attached to the silicon atom, thus

For conversion to a rubbery gel, the fluid polymer is admixed with from about 5% to 15% of the weight thereof of a catalyst for promoting oxidation type of polymerization, particularly peroxides. Suitable catalysts for this purpose are benzoyl peroxide and tert-butyl peroxide. Likewise, a small amount of sulfur may be added if allyl groups are present. The mixture may be heated with stirring until a gel results.

Either the gel or the fluid polymer with the catalyst therein is combined with a sufficient amount of a finely divided, relatively inert inorganic solid to provide from 30% to 70% of the weight of the whole. Examples of suitable inorganic solids are calcium carbonate, titanium dioxide, lithopone, barium sulphate, iron oxide, mica and silica. It is preferred that the inorganic materials be of a fineness of less than 325 mesh. However, satisfactory results are obtained if the inorganic solids are somewhat coarser, though better resiliency and other properties are obtained if a substantial amount of the inorganic solid is as fine as 500 mesh or finer.

The gelled polymer, the polymerizing catalyst, and finely-divided inorganic solids are thoroughly admixed to a smooth paste. The paste mixture may be readily charged into a mold adapted to form the cap units illustrated in the drawing. Recommended mold temperature is from 125° C. to 130° C. A reaction cross-linking the intermediate organo-silicon oxide molecules occurs to produce an elastomeric silicon oxide polymer having excellent resiliency and dielectric strength. After-curing of the elastomer is accomplished by heating in an oven at a temperature range of from 150° C. to 250° C. and at a moderate pressure, for example, 50 to 200 pounds. This baking assures completion of the reaction.

Since certain changes in practicing the invention described herein may be made without departing from its scope, it is intended that all matter contained in the above description shall be interpreted as illustrative and not in a limiting sense.

We claim as our invention:

1. An insulated electrical coil comprising, in combination, an electrical conductor having curves therein, resilient insulation encasing the body of the conductor, the insulation comprising a pair of preformed mating cap members molded of silicone elastomer, the mating cap members having side walls forming a channel conforming to the configuration of the electrical conductor and fitting snugly over the surfaces of the conductor without any substantial air space therebetween, the side walls of one cap member mating with corresponding side walls of the other cap member, the mating portion of the side walls of the cap members having angled surfaces to form a scarf joint between the corresponding mating side walls to provide a path considerably longer than the perpendicular distance through the thickness of the cap side wall to offer higher resistance to creepage of electrical current, means for maintaining the corresponding side walls in mating relationship, and a body of cured silicone elastomer paste disposed between the surfaces of the conductor and within the channels of the mating cap members, the cured silicone elastomer paste bonding with the mating cap members to tightly adhere the mating cap members to the conductor surfaces and fill any air space therebetween.

2. In the method of making an insulated electrical coil, the steps comprising coating the surfaces of an electrical conductor having curves therein with a silicone elastomer paste, applying a pair of resilient preformed complementary opposed mating channeled cap members over the curved electrical conductor so that the channeled cap members fit snugly over all the coated surfaces of the conductor, the cap members being molded of a partially cured silicone elastomer, and thereafter finally curing the partially cured silicone elastomer cap members and silicone elastomer paste by heating under pressure, the cured silicone elastomer paste bonding with the silicone elastomer cap members and tightly adhering the cap members to the conductor surfaces and filling any air space therebetween.

References Cited in the file of this patent

UNITED STATES PATENTS

| | | |
|---|---|---|
| 334,850 | Denison | Jan. 26, 1886 |
| 830,419 | Downes | Sept. 4, 1906 |
| 2,006,931 | Powers | July 2, 1935 |
| 2,066,242 | Abbott | Dec. 29, 1936 |
| 2,132,258 | Elmer | Oct. 4, 1938 |
| 2,135,315 | Walters et al. | Nov. 1, 1938 |
| 2,332,376 | Haberberger | Oct. 19, 1943 |
| 2,432,194 | Hanchett | Dec. 9, 1947 |
| 2,513,080 | Burtt | June 27, 1950 |
| 2,663,755 | McBride | Dec. 22, 1953 |

FOREIGN PATENTS

| | | |
|---|---|---|
| 455,706 | Canada | Apr. 5, 1949 |

OTHER REFERENCES

Silicone products—their characteristics, "General Electric Review," June 1951, pages 21–44.